(12) United States Patent
Lowekamp

(10) Patent No.: US 8,650,324 B2
(45) Date of Patent: Feb. 11, 2014

(54) SYSTEM AND METHOD FOR RELIABLE DISTRIBUTED COMMUNICATION WITH GUARANTEED SERVICE LEVELS

(75) Inventor: Bruce B. Lowekamp, Williamsburg, VA (US)

(73) Assignee: Skype, Dublin (IE)

(*) Notice: Subject to any disclaimer, the term of this patent is extended or adjusted under 35 U.S.C. 154(b) by 169 days.

(21) Appl. No.: 13/095,189

(22) Filed: Apr. 27, 2011

(65) Prior Publication Data
US 2012/0278398 A1 Nov. 1, 2012

(51) Int. Cl.
*G06F 15/173* (2006.01)
*G06F 15/16* (2006.01)

(52) U.S. Cl.
USPC ............... 709/240; 709/206; 709/214

(58) Field of Classification Search
USPC ............ 709/204–207, 213–216, 240; 707/609–639
See application file for complete search history.

(56) References Cited

U.S. PATENT DOCUMENTS

| | | | | |
|---|---|---|---|---|
| 6,701,342 | B1* | 3/2004 | Bartz et al. | 709/200 |
| 7,237,026 | B1* | 6/2007 | Synnestvedt | 709/225 |
| 7,693,886 | B1* | 4/2010 | Novick et al. | 707/614 |
| 8,184,560 | B2* | 5/2012 | Shaw | 370/278 |
| 8,325,747 | B2* | 12/2012 | Khivesara et al. | 370/401 |
| 2001/0056493 | A1* | 12/2001 | Mineo | 709/227 |
| 2002/0099775 | A1* | 7/2002 | Gupta et al. | 709/205 |
| 2002/0167936 | A1* | 11/2002 | Goodman | 370/352 |
| 2004/0221019 | A1* | 11/2004 | Swildens et al. | 709/217 |
| 2005/0043015 | A1* | 2/2005 | Muramatsu | 455/412.1 |
| 2006/0020697 | A1* | 1/2006 | Kelso et al. | 709/224 |
| 2006/0023665 | A1* | 2/2006 | Zellner et al. | 370/329 |
| 2007/0282915 | A1* | 12/2007 | Vosshall et al. | 707/200 |
| 2009/0111462 | A1* | 4/2009 | Krinsky et al. | 455/423 |
| 2009/0319525 | A1* | 12/2009 | Thiel et al. | 707/8 |
| 2010/0088379 | A1* | 4/2010 | Borenstein et al. | 709/206 |
| 2010/0257280 | A1* | 10/2010 | Stokking et al. | 709/231 |
| 2011/0199963 | A1* | 8/2011 | Shaw | 370/328 |
| 2012/0054763 | A1* | 3/2012 | Srinivasan | 718/104 |

* cited by examiner

*Primary Examiner* — Brendan Higa
(74) *Attorney, Agent, or Firm* — Sonia Cooper; Jim Ross; Micky Minhas

(57) ABSTRACT

A computer-implemented system and method are described for exchanging messages between nodes and servers in accordance with specified service level guarantees, while at the same time retaining compatibility with other nodes and servers not subject to the same service level guarantees. For example, a system according to one embodiment of the invention comprises: a first cluster of servers having messaging applications executed thereon for enabling message passing between a first plurality of nodes, a first message database maintained by the first cluster of servers for storing an archive of messages passed between the first plurality of nodes; a second cluster of servers having the same messaging applications executed thereon for enabling message passing between a second plurality of nodes; and a second message database maintained by the second cluster of servers for storing an archive of messages passed between the second plurality of nodes; wherein the first cluster of servers implement a first set of protocols for ensuring latency and/or data retention requirements above a first specified threshold when exchanging messages between the first plurality of nodes. The first set of protocols may ensure various other characteristics of communication including, by way of example and not limitation, message delivery receipts and guaranteed call quality for voice calls.

29 Claims, 5 Drawing Sheets

SYSTEM AND METHOD FOR RELIABLE DISTRIBUTED COMMUNICATION WITH GUARANTEED SERVICE LEVELS

BACKGROUND

1. Field of the Invention

This invention relates generally to the field of data processing systems. More particularly, the invention relates to an improved system and method for reliable, distributed communication with guaranteed service levels.

2. Description of the Related Art

Internet users today may communicate using a variety of different client applications including real-time messaging applications (e.g., instant messaging or "chat" applications) and voice/video applications. Some client messaging applications such as the Skype™ client designed by the assignee of the present application provide integrated chat and voice/video in a single software platform. While the discussion below will focus on chat messaging, the underlying principles of the invention may be implemented using any type of messaging/communication technology.

Chat messages can be delivered via several mechanisms: (1) A single centralized server (or single cluster of servers); (2) A fully distributed P2P system, where each client locates the other users' endpoints in the conversation and sends the messages directly to them; and (3) A system of cooperating servers that relay messages to each other. System (3) may resemble the USENET approach where each server maintains a list of the messages it has and at periodic intervals exchanges messages with other servers it is connected to. Approaches (2) and (3) above are similar, except that in approach (3), the clients retrieve messages from a single server, which relays messages, whereas in approach (2) the client is connected to multiple other clients and is responsible for relaying messages itself.

While each of these approaches is capable of meeting the requirements of providing a shared chat experience, each has drawbacks that make it difficult or impossible to meet the Service Level Agreement (SLA) requirements of demanding customers. In particular:

A centralized chat system can be made scalable, but it imposes a significant latency on many customers, as communication latency is limited by the speed of data transfer. For example, if the central system is located in the USA and two chat participants are in Australia, simple data transfer latency will add 500 ms to the transaction. Furthermore, a centralized system does not allow a provider to provide guaranteed service levels to particular customers while maintaining a general-purpose system for other customers. In particular, for the "freemium" business model, providers frequently wish to support large numbers of users with free services while providing better quality service to paying customers. Designing the centralized system to support premium-quality services without any impact from the free customers is very difficult, if not impossible due to surges in load.

(2) While a P2P system does not suffer from the central load management problems of (1), a provider wishing to provide guaranteed services, and in particular wishing to provide suitable auditing of such guarantees, will face difficulties in meeting these requirements. P2P software is notoriously difficult for dealing with offline users (two peers cannot exchange messages except when both are online simultaneously) and for difficulties exchanging messages due to connectivity (e.g., NAT and firewall) problems. Furthermore, documenting that SLAs were met in a distributed P2P system is very difficult, as a provider (and customer) typically desire more deterministic logging for demonstrating that the SLA has been met.

(3) A system where servers periodically relay messages to each other is generally incapable of meeting high-performance SLAs because customers connected to different servers will experience high, indeterminate latency for message delivery.

A conversation system must also provide reliability in the case of node or server failure. This is conventionally achieved using a disk-backed database in conjunction with replication. In the central (1) solution, a single database, perhaps with local replication, can easily meet this need. In (2) and (3), there is no single master record of conversations, but instead each node maintains its own history and compares its local history with other nodes to see if it is missing events. Such a scheme is typically reliable, but can be slow to synchronize for performance reasons and would typically use a horizon, such as number of days or months, beyond which it does not exchange information about the number of messages known.

Conventional databases are single-master—only one node can be the writer at a time. This is why options (1), (2), and (3) almost always consist of one or more databases, one per node, with a separate scheme to copy messages between the nodes (and thus between the databases). In an alternative approach, the database itself is distributed and handles synchronization of the messages between nodes. This form of distributed database often uses "vector-clocks" to maintain consistency between data. In essence, each participant in a chat might have a counter (the clock) attached to their chats. Each time the participant adds a new message, the clock is incremented. Nodes can determine that they have all messages in a chat by comparing the set of clocks with other nodes, without needing to compare all of the messages.

The Dynamo storage system (designed by Amazon™) and Riak™ NoSQL database are examples of storage systems based on vector clocks. Both provide techniques for reliably updating a single distributed database from multiple locations without requiring a single writer. In essence, these approaches are of type (3), with the exchange between nodes being done at the database level rather than at the messaging application level. While such an approach makes the messaging system highly reliable, it does not address the challenges of making (3) meet the high performance SLAs desired.

SUMMARY

A computer-implemented system and method are described for exchanging messages between nodes and servers in accordance with specified service level guarantees, while at the same time retaining compatibility with other nodes and servers not subject to the same service level guarantees. For example, a system according to one embodiment of the invention comprises: a first cluster of servers having messaging applications executed thereon for enabling message passing between a first plurality of nodes, a first message database maintained by the first cluster of servers for storing an archive of messages passed between the first plurality of nodes; a second cluster of servers having the same messaging applications executed thereon for enabling message passing between a second plurality of nodes; and a second message database maintained by the second cluster of servers for storing an archive of messages passed between the second plurality of nodes; wherein the first cluster of servers implement a first set of protocols for ensuring latency and/or data retention requirements above a first specified threshold when exchanging messages between the first plurality of nodes.

The first and second clusters may exchange messages to enable the users of each cluster to participate in the same conversations. The first set of protocols may ensure various other characteristics of communication including, by way of example and not limitation, message delivery receipts and guaranteed call quality for voice calls.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. For example, embodiments of the invention are described below within the context of an instant messaging or "chat" application, the underlying principles of the invention are not limited to any particular type of messaging application. In other instances, well-known structures and devices are shown in block diagram form to avoid obscuring the underlying principles of the embodiments of the invention.

One embodiment of the invention maintains a consistent, distributed database of chat messages (or other message types) while at the same time delivering a guaranteed level of performance for a certain subset of clients (i.e., for clients associated with a service level agreement (SLA) that specifies a particular level of performance). In one particular embodiment, a plurality of servers are assigned to each SLA and another plurality of servers is assigned to those users not subject to an SLA. The servers within an SLA relay messages to one another as in (3) above to maintain a distributed messaging database, but do so in a manner which ensures compliance with the SLA requirements. While clients are grouped into "SLAs" in the embodiments discussed herein, it should be noted that the underlying principles of the invention are not limited to any particular type of client groupings. Clients may be grouped based on various different specified parameters while still complying with the underlying principles of the invention.

Figure 1:
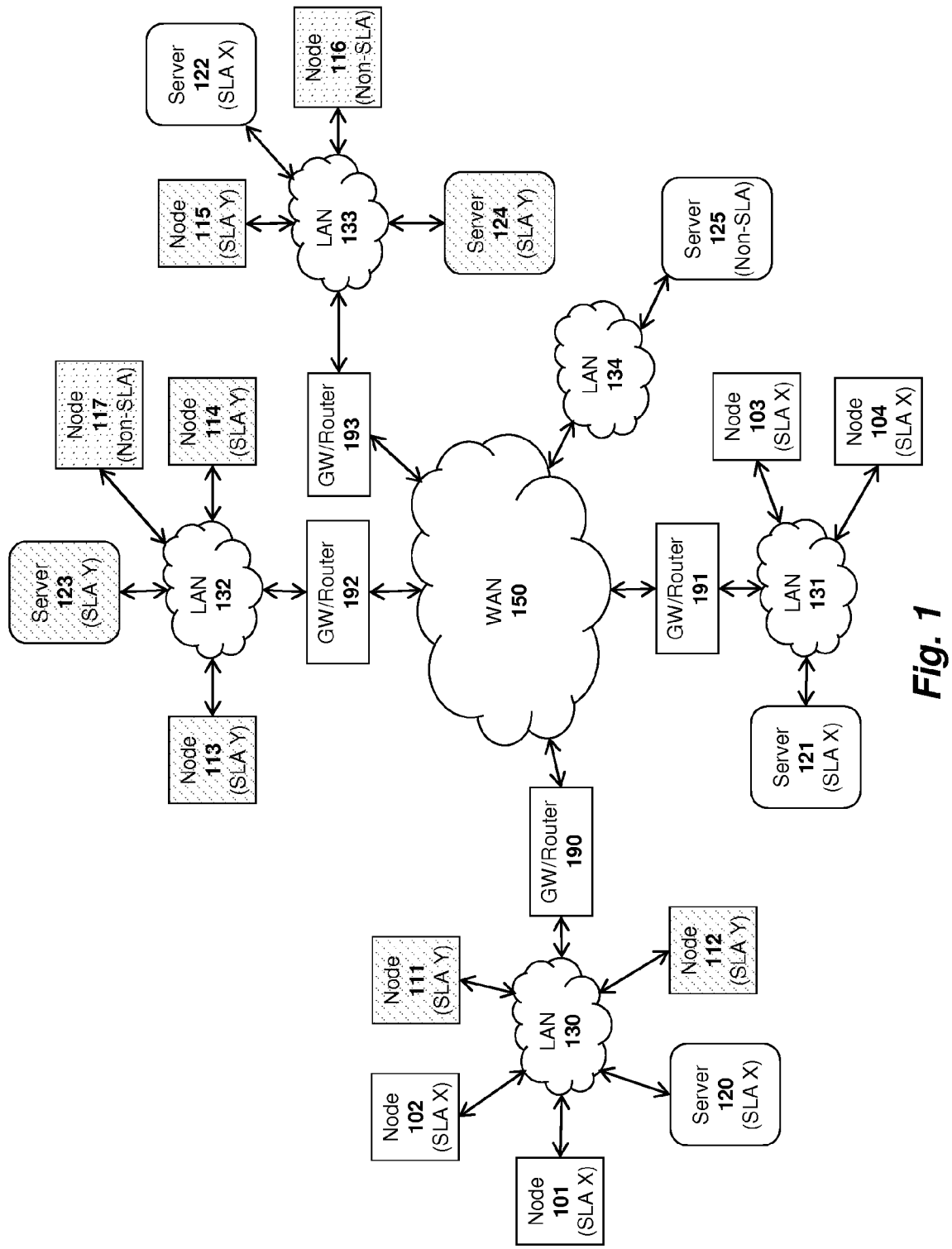
FIG. 1 illustrates a plurality of nodes and servers communicating over local area networks and wide area networks which are subject to different service level agreement (SLA) requirements or no SLA requirements.
Figure 2:
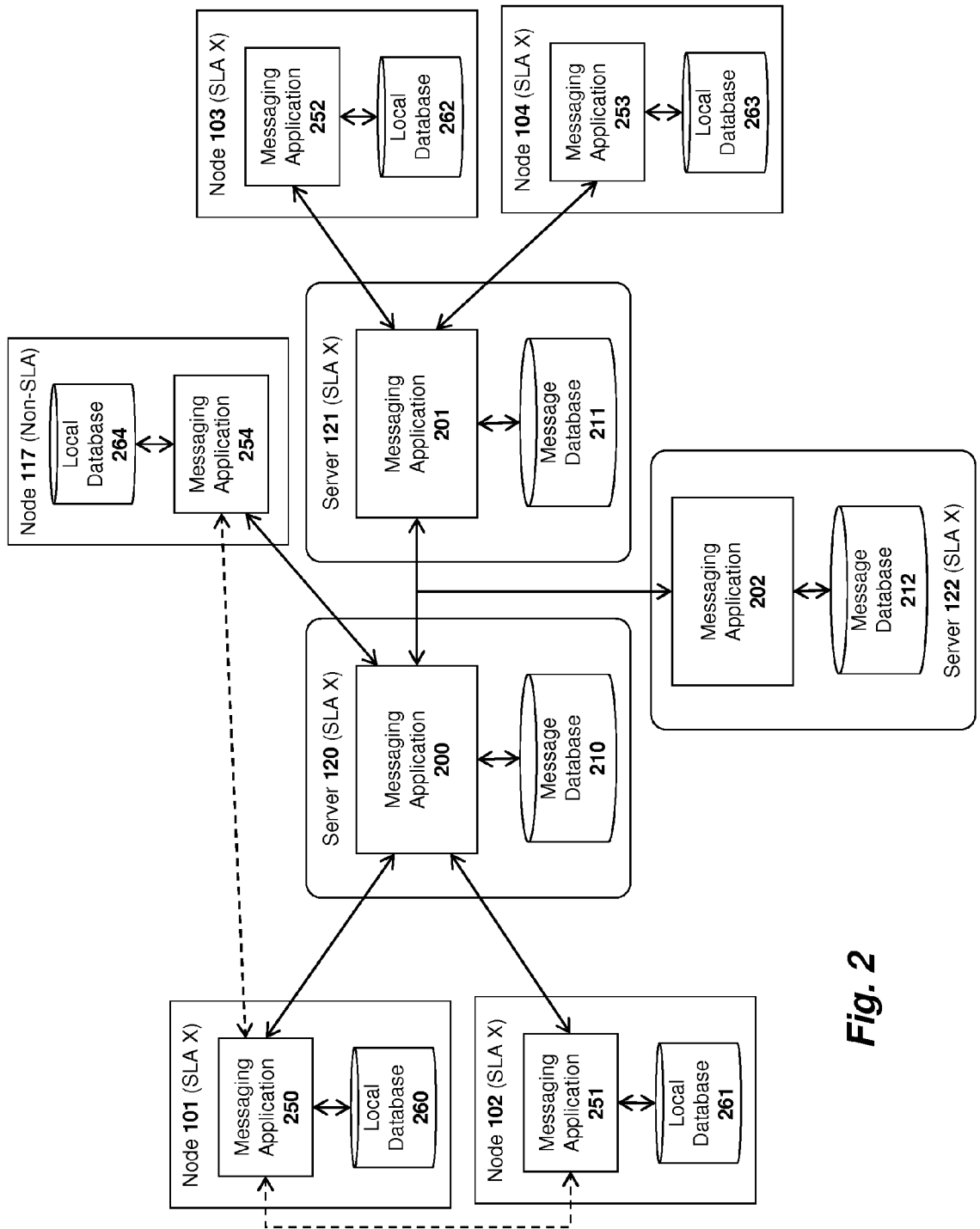
FIG. 2 illustrates messaging applications and distributed databases implemented on servers and nodes in accordance with one embodiment of the invention.

FIGS. 1-2 illustrates one particular example in which a first plurality of nodes 101-104 and servers 120-122 are associated with a first SLA (SLA X in the example) and a second plurality of nodes 111-115 and servers 123-124 are associated with a second SLA (SLA Y in the example). Other nodes 116-117 and servers 125 are not associated with any SLA.

As illustrated, each server and node is coupled to a local area network (LAN) 130-133 which may be, by way of example and not limitation, a wireless network (e.g., an 802.11n network or Bluetooth network) or a wired (e.g., Ethernet) network. The servers and nodes are also communicatively coupled over a larger, wide area network (WAN) 150 (e.g., the Internet) via gateway/router devices 190-193. In one embodiment, the servers/nodes communicate with one another using a common networking protocol such as the TCP/IP protocol. However, the underlying principles of the invention are not limited to any particular protocol type.

The "nodes" in this embodiment may be client computing devices such as portable or desktop computers, smart phones, or other types of computing devices capable of executing a messaging application. The "servers" may be server machines hosted at specified points around the WAN 150 and/or may be client computing devices configured to perform the function of a "server." Thus, in some embodiments, the "servers" may perform the dual role of both a client and a server. The servers may also include static, dedicated computing resources and/or resources made dynamically available as needed through cloud computing techniques.

Nodes associated with a particular SLA may establish chat sessions with other nodes in the same SLA or with nodes outside of the SLA. Thus, in FIG. 1, node 101 may establish chat sessions with other nodes 102-104 associated with SLA X and may also establish chat sessions with nodes 111-114 associated with SLA Y or with nodes 116-117 which are not associated with any SLA. As described below, when communicating with nodes in the same SLA, messaging occurs in a manner which ensures compliance with the SLA requirements.

As illustrated in FIG. 2, each node 101-104 executes a messaging application 250-253 to establish messaging sessions with other nodes. In one embodiment, messaging occurs through messaging applications 200-202 executed on servers 120-122, as illustrated. Each of the servers manage a distributed message database 210-212 containing a history of messages passed between each of the nodes. In addition, each individual node 101-104 may maintain its own local message database 260-263 containing a history of messages exchanged with other nodes. The local message databases 260-263 may contain a subset of the message data stored within the server message databases 210-212. As illustrated, in some cases, messaging applications may communicate directly with one another (i.e., as indicated by the dotted line between messaging application 250 and 251) and may also communicate with messaging applications 254 of nodes outside of the SLA.

In one embodiment of the invention, the messaging applications 200-202, 250-253 associated with a particular SLA (SLA X in the example) implement techniques to ensure compliance with the SLA. In particular, to ensure efficient delivery of messages within an SLA, nodes transmit new messages as soon as the new messages are ready to be transmitted, without waiting for synchronization with the message database. In one embodiment, the messaging applications 200-202 executed on the servers 120-122 execute vector clocks to ensure synchronization. As is known by those of skill in the art, vector clocks is a technique for generating a partial ordering of events in a distributed system and detecting causality violations (e.g., missing messages in the present patent application). Using vector clocks, each messaging application 200-202 maintains a counter to indicate the number of messages transmitted for a particular chat session. Messages transmitted between the messaging applications 202-202 contain the current state of the sending process's counter. Initially (at the beginning of a session) all clocks are typically set to zero. Each time a messaging application 200-202 prepares to send a message, it increments its own logical clock in the vector by one and then sends its entire vector along with the message being sent, which is marked with the current value of its own logical clock. Each time a messaging application 200-202 receives a message, it updates each element in its vector by taking the maximum of the value in its own vector clock and the value in the vector in the received message (for every element).

With this approach, the messaging application can determine if it is missing messages from another messaging application. For example, if messaging application 200 has a clock value of 4 for 202 and it then receives from 201 a clock value of 6 for 202, then it can determine that 202 has issued two messages that it (200) has not seen.

The vector clocks inform the messaging application of the highest-numbered message a particular messaging application has sent. To determine if any are missing, the messaging application must examine the sequence of messages generated by that other messaging application instance to ensure that there are no gaps. In this particular example of the vector clock algorithm, the messages are assigned sequentially increasing clock values, allowing identification of missing messages.

While the embodiment discussed above used a specific implementation of vector clocks, it should be noted that there are other similar ways of employing the basic technique to detect missing messages which may be used in alternative embodiments of the invention.

If a particular messaging application determines that it does not have all of the messages for a particular session based on the differences between the vector clock values received and its local copy of those values, it requests these messages from the other messaging applications to synchronize its database.

Figure 4:
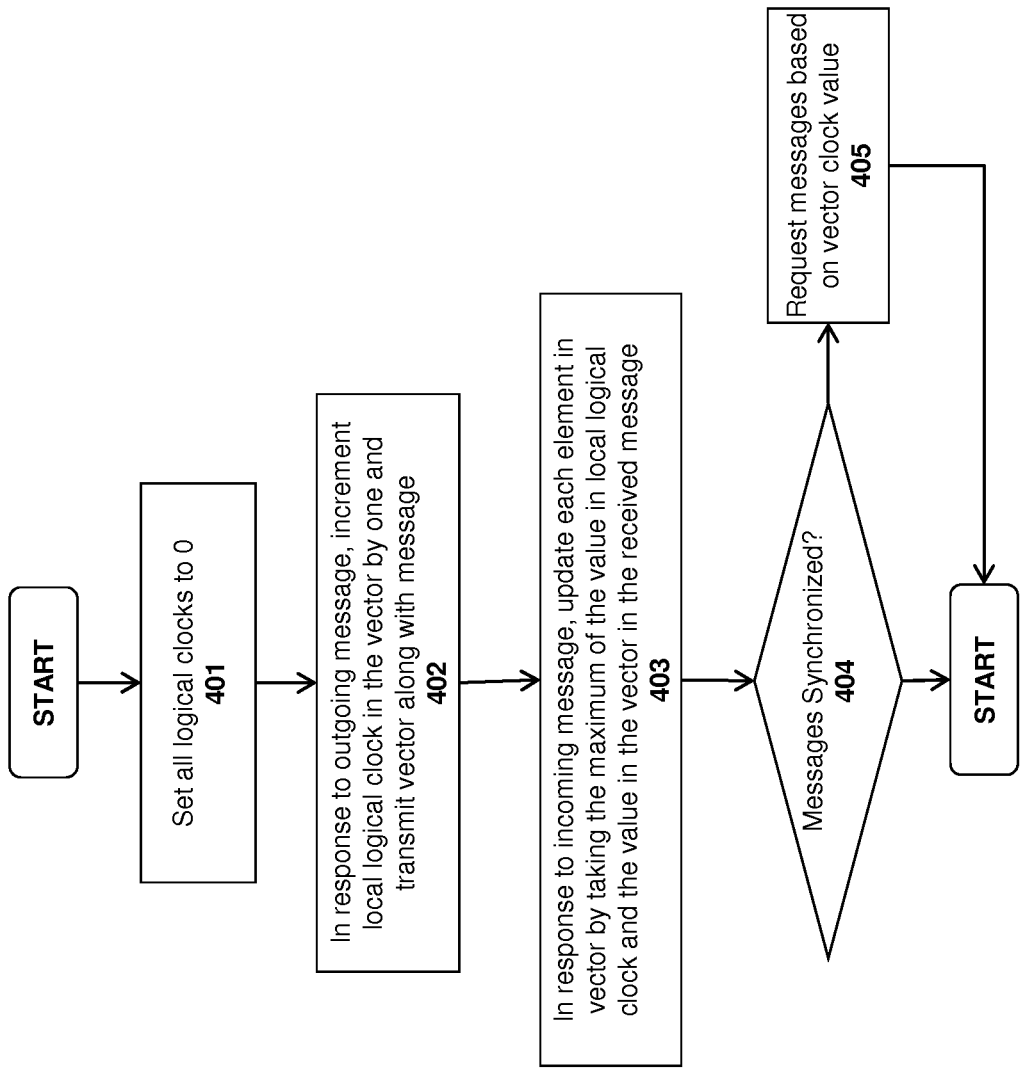
FIG. 4 illustrates one embodiment of a method for meeting SLA requirements and synchronizing databases using vector clocks.

A method utilizing vector clocks in this manner is illustrated in FIG. 4. At 401, at the start of a new messaging session, all logical clocks are set to a value of 0. At 402, in response to an outgoing message (i.e., a message being sent from a messaging application of one server to the messaging application of another server) the logical clock of the local messaging application is incremented by one and the vector containing an indication of this logical clock is transmitted to the other messaging applications. At 403, in response to an incoming message, the messaging application updates each element in the vector by taking the maximum of the value in its local logical clock and the value contained in the vector in the received message. If the value of an element of the vector in the received message is larger than its own copy of that element, determined at 404, then the messaging application knows that it is out of synch with the main messaging database. As such, at 405, it requests the messages that it needs based on the value of the vector clock.

Thus, using vector clocks in this manner, a messaging application does not need to wait to ensure that it is fully synchronized before transmitting a message, and can therefore comply more easily with the latency requirements of a particular SLA. After transmitting the message, the messaging application may use the vector clocks techniques described above to identify the messages that it needs to be fully synchronized and request those messages in the background (i.e., without forcing new messages to wait for synchronization to occur).

In one embodiment, different SLA requirements may be specified for different sets of nodes and servers and messages may be given higher (or lower) priority based on these requirements. For example, SLA X and SLA Y in the above example may represent the SLAs of two different companies with different requirements for message retention and performance. As such, the messaging applications associated with SLA X may implement one set of techniques for message retention and performance and the messaging applications associated with SLA Y may implement a different set of techniques for message retention and performance. When nodes/servers of the same SLA communicate with one another, the messaging applications will perform the techniques needed for compliance with the SLA. However, when communicating with nodes/servers outside of the SLA, a different set of techniques may be implemented. For example, in FIG. 2, messaging between messaging applications 260 and 254 of nodes 101 and 117, respectively, may not be subject to the SLA requirements because node 117 is not part of SLA X. As such, messaging application 250 and 254 may not employ vector clocks or other low-latency messaging techniques when supporting messaging sessions between nodes 101 and 117. However, when node 101 establishes a messaging session with node 103 (or other nodes subject to SLA X) the low-latency messaging techniques specified by the SLA may be used.

Alternatively, in one embodiment, any node communicating with a node subject to a particular SLA will also be subject to that SLA. Thus, in the above example, messaging applications 250 and 254 may automatically communicate using the low-latency techniques specified by SLA X because node 101 is subject to SLA X. However, if node 117 establishes a messaging session with node 116 which is also not subject to SLA requirements, then the low-latency messaging and synchronization techniques for SLA X may not be used (because neither node is subject to SLA X's requirements).

In this embodiment, a first portion of the messaging database 210-212 may be used to store messages subject to the SLA and a second portion may be used to store message not subject to the SLA. The first section of the database subject to the SLA may be stored and managed in compliance with the SLA requirements (e.g., persistently storing the messages for a specified amount of time) while the second section not subject to the SLA may be stored and managed according to a different set of requirements (e.g., messages may be deleted any time to make room for new messages). In one embodiment, a database flag or equivalent data structure may be used do identify messages subject to the SLA.

Figure 3:
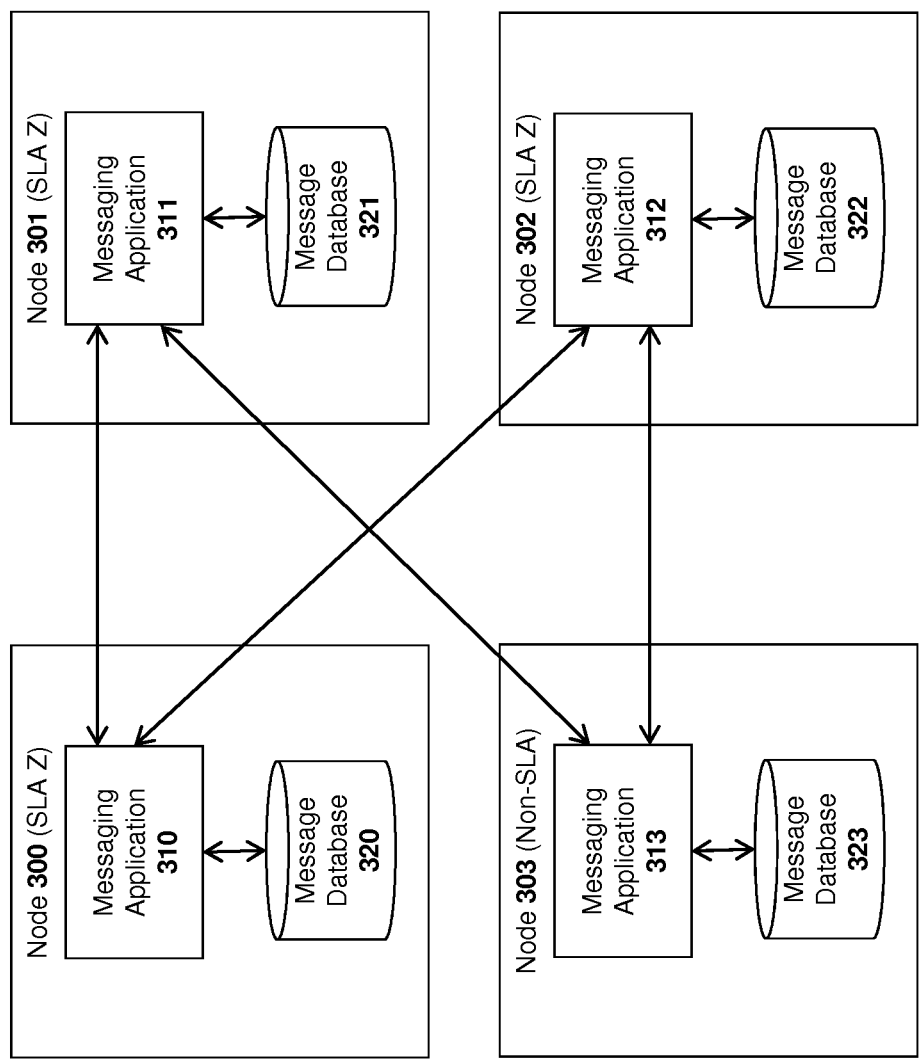
FIG. 3 illustrates a pure peer-to-peer implementation employed in one embodiment of the invention.

In one embodiment of the invention, illustrated in FIG. 3, a pure peer-to-peer network is established between messaging applications 310-313. Thus, this embodiment does not rely on servers to establish messaging sessions and synchronize message databases as in the embodiments illustrated in FIGS. 1-2. However, the same basic techniques may be employed to support low-latency message passing. For example, nodes 300-302 in the example as subject to the requirements of SLA Z. As such, the messaging applications 310-312 of these nodes may use vector clocks (or other techniques) to ensure low-latency synchronization of their respective databases 320-322. However, when communicating with messaging application 313 on node 303, which is not subject to SLA Z, these low latency techniques may not be used.

In one embodiment, SLA requirements may be based on the location of a particular node on the network. For example, if a user logs in from a hotel room in a remote country, the SLA requirements may be relaxed for this node (notwithstanding the fact that the node is associated with a particular SLA). Similarly, if the user's connection to the network is temporarily experiencing problems, then the user's messaging application may temporarily suspend the SLA requirements until the connection has improved.

In one embodiment, new nodes may be dynamically added to an existing SLA cluster and new SLA clusters may be dynamically created "in the cloud" by allocating new clusters through hosting providers that can offer network connectivity with the customer sufficient to meet the SLA. Such clusters may begin participating in all portions of the database as other SLA nodes for that customer were, but will be able to optimistically receive and propagate new messages without waiting for the synchronization to complete.

In one embodiment, to further reduce latency in compliance with the SLA, messages may be passed directly between clients. Thus, as indicated by the dotted line between messaging applications 250-251 in FIG. 2, messages sent from messaging application 250 may be transmitted directly to messaging application 251 and messages sent from messaging application 251 may be transmitted directly to messaging application 250. Synchronization with the primary messaging database 210-212 may occur simultaneously with message transmission and/or may occur at periodic intervals (e.g., every few minutes), as specified by the SLA.

Reliability may also be specified by the SLA. For example, an SLA cluster (e.g., SLA X or SLA Y illustrated in FIG. 1) may be required to meet its performance requirements even in the event of three simultaneous server failures within a cluster of servers. This could be accomplished, for example, by providing backup servers which run in the background, maintain synchronization with the primary messaging servers, and take over communication in the event of a server failure. In one embodiment, known cloud computing techniques may be employed to ensure reliability in accordance with an SLA.

In addition, an SLA may be met by configuring messaging applications to connect with two different SLA clusters. In this case, a client's application program may participate the vector-clock techniques discussed above, as it would be receiving updates from the different clusters annotated with vector-clock information.

Reliability within a single SLA cluster could be implemented either through vector-clock or non-vector clock techniques. For example, a single "cluster" could be logically partitioned into independently functioning parts, with a user's messaging application making a connection to each half as described above. Alternatively, the user's messaging application program may make a single connection, but the cluster may be designed with rapid fail-over necessary to meet the SLA. In essence, there is a choice of whether to use the vector-clock algorithm inter- or intra-site. Both techniques can provide suitable reliability.

In one embodiment, chat sessions are categorized into different chat "topics," only some of which may be subject to the requirements of the SLA. In such a case, an SLA cluster may not perform long-term storage of chat topics if not required by the SLA. Instead, if the topics are synchronized with the larger non-SLA messaging system (i.e., non-SLA servers/databases), the SLA cluster could cease participating in topics once no active users are involved and resume participation when active SLA users return.

In one embodiment, an SLA cluster is designed so that the SLA-covered conversations are considered proprietary by the customer subscribing to the SLA and while the same client messaging application may be used for both proprietary and non-proprietary conversations, the cluster might provide separate services for the proprietary conversations and synchronize them with other SLA clusters serving that customer, but not with the broader network or with other SLA customers.

In the event that an SLA server fails when a node is in mid-transaction posting a new message, that node cannot immediately determine whether its message was successfully posted or not. In one embodiment, such a node may simply re-post the message. The vector-clock based synchronization techniques described herein will detect the duplicate message if it was successfully propagated by the failed node, and other users will not see it as a duplicated message.

Figure 5:
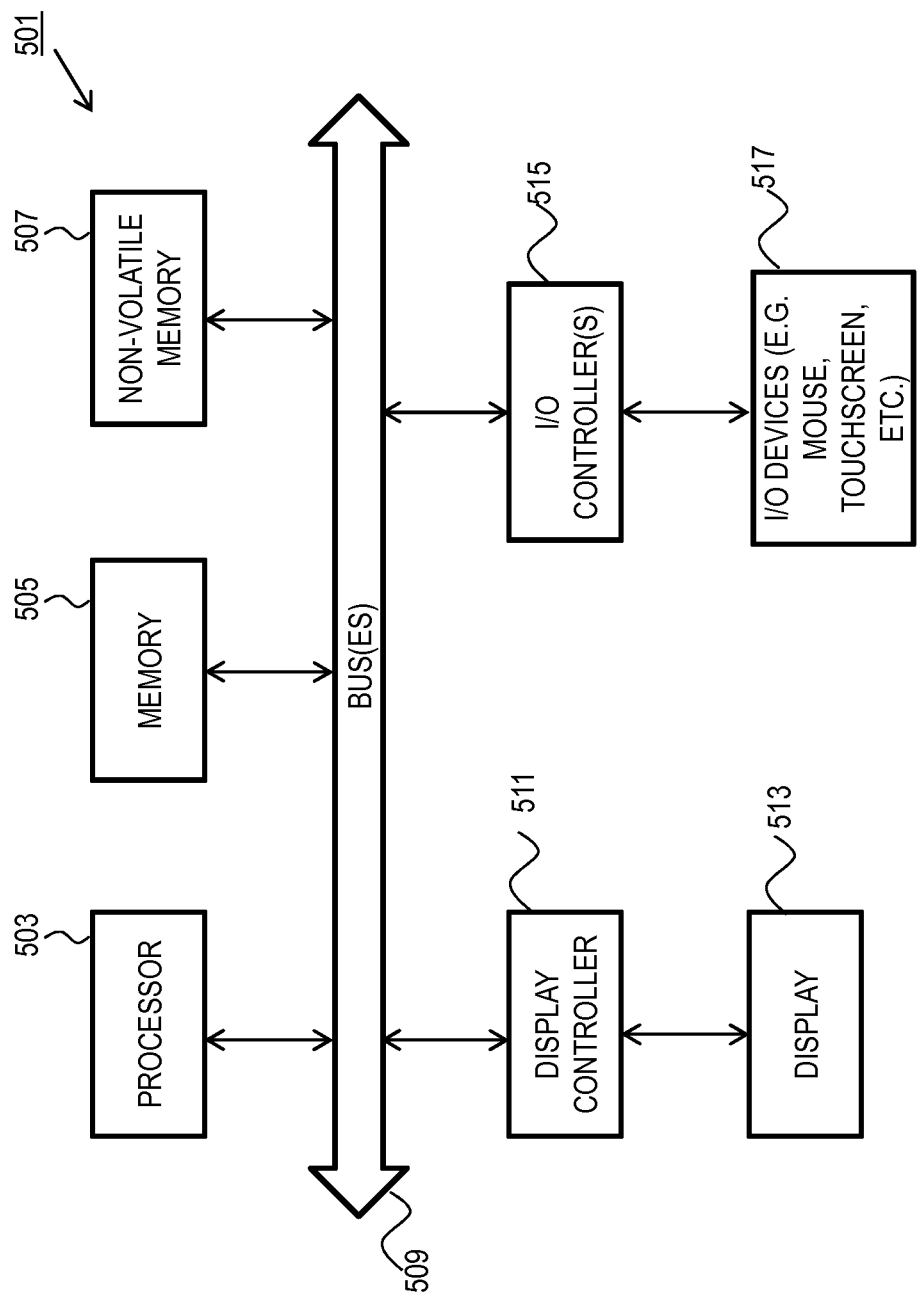
FIG. 5 illustrates a computer architecture employed for nodes and/or servers in one embodiment of the invention.

Any of the techniques described herein can be implemented on a variety of different data processing devices, including general purpose computer systems, special purpose computer systems, and mobile computing devices. For example, the data processing systems which may execute the methods described herein may include a desktop computer, laptop computer, tablet computer, smart phone, cellular telephone, personal digital assistant (PDA), embedded electronic device or any form of consumer electronic device. FIG. 5 shows one example of a typical data processing system which may be used with the present invention. Note that while FIG. 5 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 5 may also be used with the present invention. The data processing system of FIG. 5 may be a Macintosh computer or PC computer. As shown in FIG. 5, the data processing system 501 includes one or more buses 509 which serve to interconnect the various components of the system. One or more processors 503 are coupled to the one or more buses 509 as is known in the art. Memory 505 may be DRAM or non-volatile RAM or may be flash memory or other types of memory. This memory is coupled to the one or more buses 509 using techniques known in the art. The data processing system 501 can also include non-volatile memory 507 which may be a hard disk drive or a flash memory or a magnetic optical drive or magnetic memory or an optical drive or other types of memory systems which maintain data even after power is removed from the system. The non-volatile memory 507 and the memory 505 are both coupled to the one or more buses 509 using known interfaces and connection techniques. A display controller 511 is coupled to the one or more buses 509 in order to receive display data to be displayed on a display device 513 which can display any one of the user interface features or embodiments described herein. The display device 513 can include an integrated touch input to provide a touch screen. The data processing system 501 can also include one or more input/output (I/O) controllers 515 which provide interfaces for one or more I/O devices, such as one or more mice, touch screens, touch pads, joysticks, and other input devices including those known in the art and output devices (e.g. speakers). The input/output devices 517 are coupled through one or more I/O controllers 515 as is known in the art. While FIG. 5 shows that the non-volatile memory 507 and the memory 505 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 509 may include one or more bridges or controllers or adapters to interconnect between various buses. In one embodiment, the I/O controller 515 includes a USB adapter for controlling USB peripherals and can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 505 or the non-volatile memory 507 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components. Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a client P2P application, the underlying principles of the invention may be implemented in the form of a server application or any other form of client application. Accordingly, the scope and spirit of the invention should be judged in terms of the claims which follow.

What is claimed is:

1. A computer-implemented system comprising:
a first cluster of servers having messaging applications executed thereon for enabling message passing between a first plurality of nodes, a first message database maintained by the first cluster of servers for storing an archive of messages passed between the first plurality of nodes;
a second cluster of servers having the same messaging applications executed thereon for enabling message passing between a second plurality of nodes; and a second message database maintained by the second cluster of servers for storing an archive of messages passed between the second plurality of nodes;
wherein:
the first cluster and the second cluster are included in a plurality of clusters arranged for multiple different service level agreements (SLAs) such that each cluster corresponds to a different group of nodes and corresponding service level requirements; and
the first cluster of servers implement a first set of protocols for ensuring latency and data retention requirements specified by a first service level agreement (SLA) when exchanging messages between the first plurality of nodes, the first SLA further specifying requirements based upon a location of particular nodes within a network.

2. The system as in claim 1 wherein the second cluster of servers implement a second set of protocols for ensuring latency and data retention requirements specified by a second SLA when exchanging messages between the second plurality of nodes.

3. The system as in claim 1 further comprising a third cluster of servers that implement a third set of protocols which are associated with nodes that are not subject to a service level agreement (SLA).

4. The system as in claim 1 wherein the first set of protocols include a vector clock protocol, wherein in accordance with the vector clock protocol, servers transmit messages to other servers before all messages for a particular messaging session have been received by all servers.

5. The system as in claim 4 wherein the vector clock protocol comprises:
incrementing a counter at each server as each server transmits a new message; and
transmitting the counter value to other servers with the first cluster when passing messages to those servers.

6. The system as in claim 5 further comprising:
receiving a counter value at a first one of the servers in the first cluster, the counter value being transmitted from a second one of the servers in the first cluster;
comparing the received counter value to a current counter value at the first one of the servers in the first cluster; and
if the counter values are not equal, then the first server requests any unreceived messages from the second server based on the counter value received from the second server.

7. The system as in claim 1 wherein the messaging applications are instant messaging applications or chat applications.

8. The system as in claim 1 wherein the data retention requirements comprise storing an archive of messages passed between nodes for a specified duration of time.

9. The system as in claim 1 wherein the first set of protocols specify that each server in the first cluster of servers transmits new messages as soon as the new messages are ready to be transmitted without waiting for synchronization with the message database.

10. A computer-implemented method comprising:
arranging a plurality of clusters of servers for multiple different service level agreements (SLAs) such that each cluster corresponds to a different group of nodes and corresponding service level requirements, the service level; and
executing messaging applications on a first cluster of servers in the plurality of clusters to enable message passing between a first plurality of nodes, storing an archive of messages passed between the first plurality of nodes in a first message database maintained by the first cluster of servers;

executing the same messaging applications on a second cluster of servers in the plurality of clusters to enable message passing between a second plurality of nodes; and storing an archive of messages passed between the second plurality of nodes in a second message database maintained by the second cluster of servers;

implementing a first set of protocols on the first cluster of servers for ensuring latency and data retention requirements specified by a first service level agreement (SLA) when exchanging messages between the first plurality of nodes, the first SLA further specifying requirements based upon a location of particular nodes within a network.

11. The method as in claim 10 wherein the second cluster of servers implement a second set of protocols for ensuring latency and data retention requirements specified by a second service level agreement (SLA) when exchanging messages between the second plurality of nodes.

12. The method as in claim 10 further comprising executing the same messaging applications on a third cluster of servers that implement a third set of protocols which are associated with nodes that are not subject to a service level agreement.

13. The method as in claim 10 wherein the first set of protocols include a vector clock protocol, wherein in accordance with the vector clock protocol, servers transmit messages to other servers before all messages for a particular messaging session have been received by all servers.

14. The method as in claim 13 wherein the vector clock protocol comprises:
incrementing a counter at each server as each server transmits a new message; and
transmitting the counter value to other servers with the first cluster when passing messages to those servers.

15. The method as in claim 14 further comprising:
receiving a counter value at a first one of the servers in the first cluster, the counter value being transmitted from a second one of the servers in the first cluster;
comparing the received counter value to a current counter value at the first one of the servers in the first cluster; and
if the counter values are not equal, then the first server requests any unreceived messages from the second server based on the counter value received from the second server.

16. The method as in claim 10 wherein the messaging applications are instant messaging applications or chat applications.

17. The method as in claim 10 wherein the data retention requirements comprise storing an archive of messages passed between nodes for a specified duration of time.

18. The method as in claim 10 wherein the first service level agreement (SLA) further specifies topics to which requirements of the first SLA apply.

19. The method as in claim 10 wherein the first set of protocols specify that each server in the first cluster of servers transmits new messages as soon as the new messages are ready to be transmitted without waiting for synchronization with the message database.

20. A data processing system comprising:
one or more processors associated with a plurality of clusters of servers for multiple different service level agreements (SLAs) such that each cluster corresponds to a different group of nodes and corresponding service level requirements;
memory having program code stored thereon which, when executed by the one or more processors, causes the data processing system to perform operations of:
exchanging messages from messaging applications executed on a first cluster of servers in the plurality of clusters between a first plurality of nodes,
storing an archive of messages passed between the first plurality of nodes in a first message database maintained by the first cluster of servers;
exchanging messages from messaging applications executed on a second cluster of servers in the plurality of clusters between a second plurality of nodes; and
storing an archive of messages passed between the second plurality of nodes in a second message database maintained by the second cluster of servers;
implementing a first set of protocols on the first cluster of servers for ensuring latency and data retention requirements specified by a first service level agreement (SLA) when exchanging messages between the first plurality of nodes, the first SLA further specifying requirements based upon a location of particular nodes within a network.

21. The data processing system as in claim 20 wherein the second cluster of servers implement a second set of protocols for ensuring latency and data retention requirements specified by a second service level agreement (SLA) when exchanging messages between the second plurality of nodes.

22. The data processing system as in claim 20 wherein the program code further causes the data processing system to perform operations of: exchanging messages from messaging applications executed on a third cluster of servers that implement a third set of protocols which are associated with nodes that are not subject to a service level agreement.

23. The data processing system as in claim 22 wherein the messaging applications are instant messaging applications or chat applications.

24. The data processing system as in claim 22 wherein the data retention requirements comprise storing an archive of messages passed between nodes for a specified duration of time.

25. The data processing system as in claim 20 wherein the first set of protocols include a vector clock protocol, wherein in accordance with the vector clock protocol, servers transmit messages to other servers before all messages for a particular messaging session have been received by all servers.

26. The data processing system as in claim 25 wherein the vector clock protocol comprises:
incrementing a counter at each server as each server transmits a new message; and
transmitting the counter value to other servers with the first cluster when passing messages to those servers.

27. The data processing system as in claim 26 comprising additional program code to cause the machine to perform the operations of:
receiving a counter value at a first one of the servers in the first cluster, the counter value being transmitted from a second one of the servers in the first cluster;
comparing the received counter value to a current counter value at the first one of the servers in the first cluster; and
if the counter values are not equal, then the first server requests any unreceived messages from the second server based on the counter value received from the second server.

28. The data processing system as in claim 20 wherein the first service level agreement (SLA) further specifies a call quality for voice calls.

29. The data processing system as in claim 20 wherein the first set of protocols specify that each server in the first cluster of servers transmits new messages as soon as the new messages are ready to be transmitted without waiting for synchronization with the message database.

* * * * *